(12) United States Patent
Toshima

(10) Patent No.: US 8,964,195 B2
(45) Date of Patent: Feb. 24, 2015

(54) RECORDING DEVICE FOR DETECTING THE LENGTH OF A RECORDING MEDIUM, A CONTROL DEVICE, A CONTROL METHOD FOR A RECORDING DEVICE AND A RECORDING MEDIUM

(71) Applicant: Seiko Epson Corporation, Tokyo (JP)

(72) Inventor: Kazuya Toshima, Ueda (JP)

(73) Assignee: Seiko Epson Corporation, Tokyo (JP)

( * ) Notice: Subject to any disclaimer, the term of this patent is extended or adjusted under 35 U.S.C. 154(b) by 127 days.

(21) Appl. No.: 13/719,381

(22) Filed: Dec. 19, 2012

(65) Prior Publication Data

US 2013/0188202 A1    Jul. 25, 2013

(30) Foreign Application Priority Data

Jan. 25, 2012  (JP) ................................ 2012-013357

(51) Int. Cl.
```
G06F 3/12       (2006.01)
H04N 1/23       (2006.01)
H04N 1/047      (2006.01)
```
(52) U.S. Cl.
CPC ........... *H04N 1/2323* (2013.01); *H04N 1/0473* (2013.01); *H04N 1/233* (2013.01); *H04N 2201/04737* (2013.01); *H04N 2201/04786* (2013.01)
USPC .......................... 358/1.13; 358/1.15; 358/474

(58) Field of Classification Search
CPC ... H04N 1/2323; H04N 1/0473; H04N 1/233; H04N 2201/04737
USPC ......... 358/474, 1.13, 1.15; 347/116; 399/394, 399/45, 85; 271/9.06
See application file for complete search history.

(56) References Cited

U.S. PATENT DOCUMENTS

| | | | | |
|---|---|---|---|---|
| 5,321,486 A | * | 6/1994 | Nanbu et al. | 399/14 |
| 5,581,344 A | * | 12/1996 | Makita | 399/45 |
| 5,625,466 A | * | 4/1997 | Nakajima | 358/449 |
| 5,671,163 A | * | 9/1997 | Iida | 399/45 |
| 5,719,968 A | * | 2/1998 | Hashimoto et al. | 382/288 |
| 5,760,912 A | * | 6/1998 | Itoh | 358/296 |
| 6,862,428 B2 | | 3/2005 | Sasaki | |
| 7,133,147 B2 | * | 11/2006 | Komada | 358/1.15 |
| 7,465,009 B2 | * | 12/2008 | Fujita | 347/16 |
| 7,738,830 B2 | * | 6/2010 | Isamikawa et al. | 399/408 |
| 7,760,370 B2 | * | 7/2010 | Oki | 358/1.1 |
| 8,416,448 B2 | * | 4/2013 | Saito | 358/1.18 |
| 2005/0275894 A1 | * | 12/2005 | Minowa | 358/1.18 |
| 2007/0285697 A1 | * | 12/2007 | Ebina et al. | 358/1.12 |

FOREIGN PATENT DOCUMENTS

| | | |
|---|---|---|
| JP | 2000-052603 A | 2/2000 |
| JP | 2002-255393 A | 9/2002 |
| JP | 2002-361957 A | 12/2002 |

* cited by examiner

*Primary Examiner* — Dennis Dicker
(74) *Attorney, Agent, or Firm* — Lowe Hauptman & Ham, LLP

(57) ABSTRACT

A multifunction device has a recording controller that buffers image data for an image to be recorded on a medium to an image buffer, and starts recording the image from a specific start recording position on the medium based on the buffered image data; a media length detector that detects the length of the medium being conveyed; an image length calculator that calculates the length of the image; and a start recording position controller that sets the start recording position for recording the image to the medium based on the length of the medium detected by the media length detector, and the length of the image to be recorded on the medium calculated by the image length calculator.

6 Claims, 10 Drawing Sheets

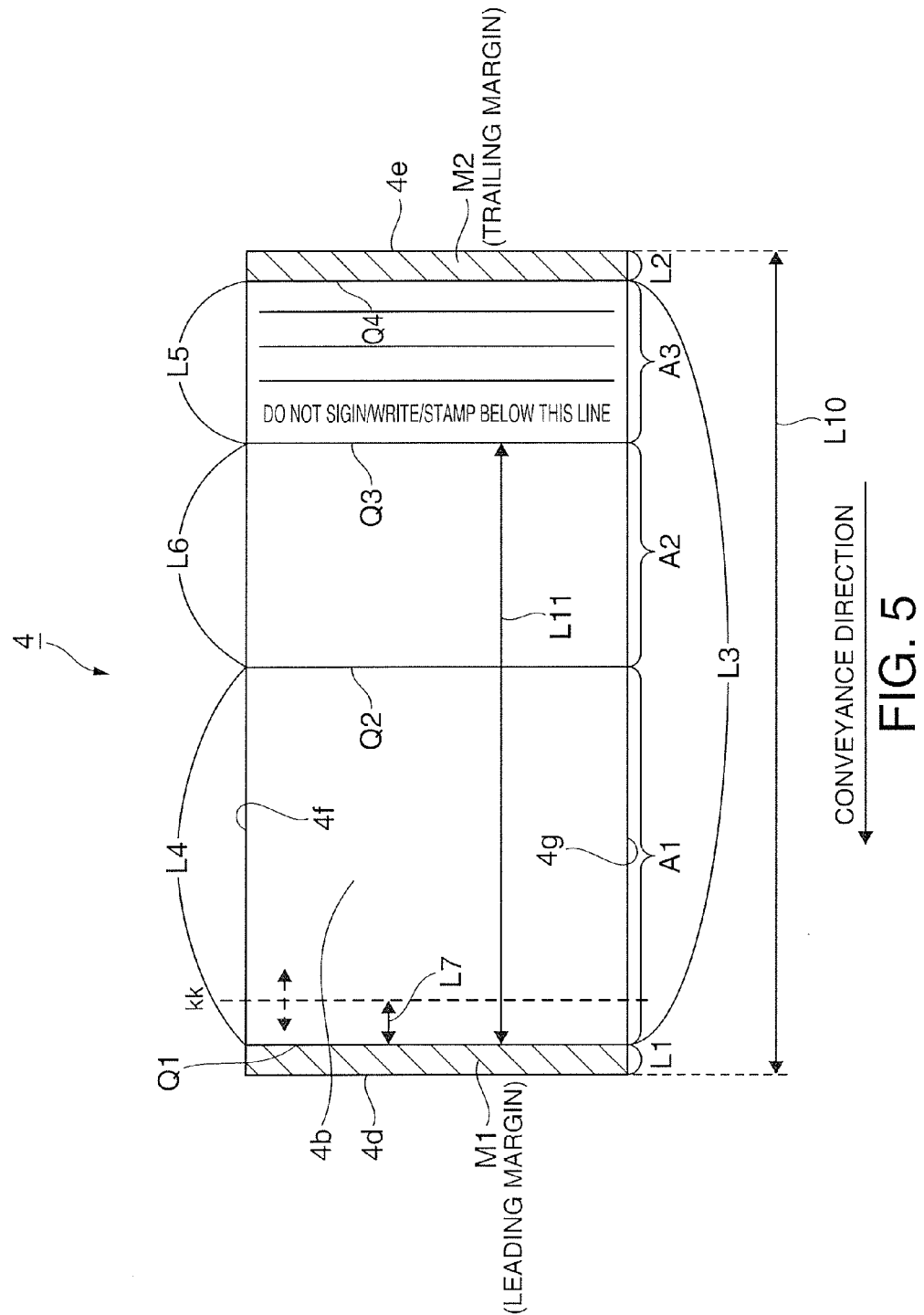

RECORDING DEVICE FOR DETECTING THE LENGTH OF A RECORDING MEDIUM, A CONTROL DEVICE, A CONTROL METHOD FOR A RECORDING DEVICE AND A RECORDING MEDIUM

RELATED APPLICATIONS

The present application is based on, and claims priority from, Japanese Application Number 2012-013357, filed Jan. 25, 2012, the disclosure of which is hereby incorporated by reference herein in its entirety.

BACKGROUND

1. Technical Field

The present invention relates to a recording device that conveys media and records on the media during conveyance, a control device that controls the recording device, a method of controlling the recording device, and a computer-readable recording medium on which a program for controlling the recording device is recorded.

2. Related Art

Recording devices (media processing devices) that convey media such as checks, and record images on the media while the media is being conveyed, are known from the literature. See, for example, Japanese Unexamined Patent Appl. Pub. JP-A-2002-255393.

Recording devices such as described above that record images while conveying the medium may be required to record images in particular parts of the recordable area of the recording medium, such as a section at the trailing end or a section in the middle part of the recording medium. In this situation, the timing when image recording starts must be suitably adjusted so that the image is recorded from a position corresponding to the area where the image should be recorded. Particularly when recording on media such as checks that may vary in size, the image must be recorded to an appropriate position corresponding to the area where the image should be recorded regardless of the size of the medium.

SUMMARY

The present invention is directed to solving the foregoing problem by enabling recording an image to a position corresponding to an area on the medium where the image should be recorded regardless of the size of the medium.

One aspect of the invention is a recording device including: a recording head disposed to a conveyance path of a recording medium; a conveyance unit that conveys the medium in a conveyance direction through the conveyance path; a recording control unit that writes image data for an image to be recorded on the medium to an image buffer, controls the recording head and the conveyance unit based on the buffered image data, starts recording the image from a specific start recording position on the medium, and records the image on the medium; a media length detection unit that detects the length of the medium while the medium is conveyed by the conveyance unit; an image length calculation unit that calculates the length of the image to be recorded based on the image data; and a start recording position setting unit that, to record the image on the medium, sets the start recording position based on the length of the medium detected by the media length detection unit and the length of the image to be recorded on the medium calculated by the image length calculation unit.

When recording an image on the recording medium, the recording device according to this aspect of the invention can set the start recording position based on the actual length of the medium and the actual length of the image to be recorded on the medium. As a result, the recording device can set the start recording position to a suitable position based on the relationship between the actual length of the medium, the actual length of the image to be recorded on the medium, and the area where the image should be recorded on the medium, and can thereby record the image to an appropriate position corresponding to the area where the image should be recorded on the medium regardless of the size of the medium.

Note that the length of the medium is a length including the margins when margins where image recording is prohibited are also formed on the medium.

In another aspect of the invention, the start recording position setting unit sets the start recording position to the position for recording the image so that the trailing end of the image is positioned to a position corresponding to the trailing end of the medium by setting a position separated from the leading end of the medium by an amount corresponding to the difference between the length of the medium and the length of the image to be recorded on the medium as the start recording position.

The recording device in this aspect of the invention can set the start recording position so that the image is recorded with the trailing end of the image at a position corresponding to the trailing end of the medium based on the actual length of the medium and the actual length of the image, and when recording the image to an area formed at the trailing end part of the medium, can record the image at a position appropriate to this area.

Note that when a margin where image recording is prohibited is formed at the leading end part or trailing end part of the recording medium, the leading end and trailing end of the medium include the corresponding margin.

In another aspect of the invention, the start recording position setting unit sets the start recording position to the position for recording the image so that the image is positioned in the middle of the medium by calculating the margin between the leading end of the medium and the leading end of the image when the image is recorded in the middle of the medium based on the length of the medium and the length of the image to be recorded on the medium, and setting the start recording position based on the calculated margin.

The recording device in this aspect of the invention can set the start recording position so that the image is recorded in the middle of the medium based on the actual length of the medium and the actual length of the image, and when recording the image to an area formed in the middle of the medium, can record the image at a position appropriate to this area.

In another aspect of the invention, the start recording position setting unit can set the start recording position to the position for recording the image so that the trailing end of the image is positioned to a position corresponding to the trailing end of the medium by setting a position separated from the leading end of the medium by an amount corresponding to the difference between the length of the medium and the length of the image to be recorded on the medium as the start recording position; can set the start recording position to the position for recording the image so that the image is positioned in the middle of the medium by calculating the margin between the leading end of the medium and the leading end of the image when the image is recorded in the middle of the medium based on the length of the medium and the length of the image to be recorded on the medium, and setting the start recording position based on the calculated margin; and can change whether the start recording position is set to the position for recording the image so that the trailing end of the image is positioned to a position corresponding to the trailing end of the medium, or is set to the position for recording the image so that the image is positioned in the middle of the medium, according to a command.

The recording device according to this aspect of the invention can set the start recording position appropriately according to the area where the image should be recorded on the medium.

In a recording device according to another aspect of the invention, the conveyance unit can convey the medium in the opposite direction as the conveyance direction on the conveyance path; a sensor that is used by the media length detection unit to detect the length of the medium is disposed to the conveyance path on the upstream side of the recording head in the conveyance direction; and if the start recording position set by the start recording position setting unit has passed to the downstream side in the conveyance direction from the position of the recording head at the time the trailing end of the medium has passed the sensor and detecting the length of the medium by the media length detection unit is completed, the recording control unit conveys the medium in the reverse of the conveyance direction with the conveyance unit to position the start recording position on the upstream side in the conveyance direction from the position of the recording head, and then records the image.

Depending upon the relationship between the length of the medium and the distance between the recording head and the sensor, the start recording position on the medium may have already past to the downstream side of the recording head by the time the trailing end of the medium has past the sensor and detecting the medium length is completed when the media length is detected using a sensor disposed upstream from the recording head in the conveyance direction, and recording cannot start from the start recording position. In this situation, the recording device according to this aspect of the invention records the image after conveying the medium in the reverse of the conveyance direction with the conveyance unit so that the start recording position is positioned on the upstream side in the conveyance direction from the position of the recording head, and can therefore start recording the image from the start recording position.

Another aspect of the invention is a control device that controls a recording device having a recording head disposed to a conveyance path of a recording medium, and a conveyance unit that conveys the medium in a conveyance direction through the conveyance path, the control device including: a recording control unit that writes image data for an image to be recorded on the medium to an image buffer, controls the recording head and the conveyance unit based on the buffered image data, starts recording the image from a specific start recording position on the medium, and records the image on the medium; a media length detection unit that detects the length of the medium while the medium is conveyed by the conveyance unit; an image length calculation unit that calculates the length of the image to be recorded based on the image data; and a start recording position setting unit that, to record the image on the medium, sets the start recording position based on the length of the medium detected by the media length detection unit and the length of the image to be recorded on the medium calculated by the image length calculation unit.

When recording an image on the recording medium, the control device according to this aspect of the invention can set the start recording position based on the actual length of the medium and the actual length of the image to be recorded on the medium. As a result, the control device can set the start recording position to a suitable position based on the relationship between the actual length of the medium, the actual length of the image to be recorded on the medium, and the area where the image should be recorded on the medium, and can thereby record the image to an appropriate position corresponding to the area where the image should be recorded on the medium regardless of the size of the medium.

Another aspect of the invention is a control method for a recording device having a recording head disposed to a conveyance path of a recording medium, a conveyance unit that conveys the medium in a conveyance direction through the conveyance path, and a recording control unit that writes image data for an image to be recorded on the medium to an image buffer, controls the recording head and the conveyance unit based on the buffered image data, starts recording the image from a specific start recording position on the medium, and records the image on the medium, wherein to record an image on the medium, the control method includes: detecting the length of the medium while the medium is conveyed by the conveyance unit; calculating the length of the image to be recorded based on the image data; and setting the start recording position based on the detected length of the medium and the calculated length of the image to be recorded on the medium.

When recording an image on the recording medium using the control method according to this aspect of the invention, the recording device can set the start recording position based on the actual length of the medium and the actual length of the image to be recorded on the medium. As a result, the recording device can set the start recording position to a suitable position based on the relationship between the actual length of the medium, the actual length of the image to be recorded on the medium, and the area where the image should be recorded on the medium, and can thereby record the image to an appropriate position corresponding to the area where the image should be recorded on the medium regardless of the size of the medium.

In another aspect of the invention, setting the start recording position sets the start recording position to the position for recording the image so that the trailing end of the image is positioned to a position corresponding to the trailing end of the medium by setting a position separated from the leading end of the medium by an amount corresponding to the difference between the length of the medium and the length of the image to be recorded on the medium as the start recording position, or setting the start recording position sets the start recording position to the position for recording the image so that the image is positioned in the middle of the medium by calculating the margin between the leading end of the medium and the leading end of the image when the image is recorded in the middle of the medium based on the length of the medium and the length of the image to be recorded on the medium, and setting the start recording position based on the calculated margin.

The control method according to this aspect of the invention enables the recording device to set the start recording position to an appropriate position corresponding to the area where the image should be recorded on the medium.

In a control method for a recording device according to another aspect of the invention, the recording device can convey the medium in the opposite direction as the conveyance direction on the conveyance path, and has a sensor used by the media length detection unit to detect the length of the medium disposed to the conveyance path on the upstream side of the recording head in the conveyance direction. The control method also includes conveying the medium in the reverse of the conveyance direction with the conveyance unit to position the start recording position on the upstream side in the conveyance direction from the position of the recording head, and then recording the image, if the start recording position set by the start recording position setting unit has passed to the downstream side in the conveyance direction from the position of the recording head at the time the trailing end of the medium has passed the sensor and detecting the length of the medium by the media length detection unit is completed.

Another aspect of the invention is a computer-readable recording medium recording a program executed by a control unit that controls a recording device having a recording head disposed to a conveyance path of a recording medium, a conveyance unit that conveys the medium in a conveyance direction through the conveyance path, and a recording control unit that writes image data for an image to be recorded on the medium to an image buffer, controls the recording head and the conveyance unit based on the buffered image data, starts recording the image from a specific start recording position on the medium, and records the image on the medium, the program causing the control unit to function as: a media length detection unit that detects the length of the medium while the medium is conveyed by the conveyance unit; an image length calculation unit that calculates the length of the image to be recorded based on the image data; and a start recording position setting unit that, to record the image on the medium, sets the start recording position based on the length of the medium detected by the media length detection unit and the length of the image to be recorded on the medium calculated by the image length calculation unit.

With the computer-readable recording medium recording a program according to this aspect of the invention, when recording an image on the recording medium, the recording device can set the start recording position based on the actual length of the medium and the actual length of the image to be recorded on the medium. As a result, the recording device can set the start recording position to a suitable position based on the relationship between the actual length of the medium, the actual length of the image to be recorded on the medium, and the area where the image should be recorded on the medium, and can thereby record the image to an appropriate position corresponding to the area where the image should be recorded on the medium regardless of the size of the medium.

Effect of the Invention

The invention enables recording an image to a position corresponding to the area where the image should be recorded on the medium regardless of the size of the medium.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 5 shows the back of a check.

DESCRIPTION OF EMBODIMENTS

A preferred embodiment of the present invention is described below with reference to the accompanying figures.
Embodiment 1

Figure 1:
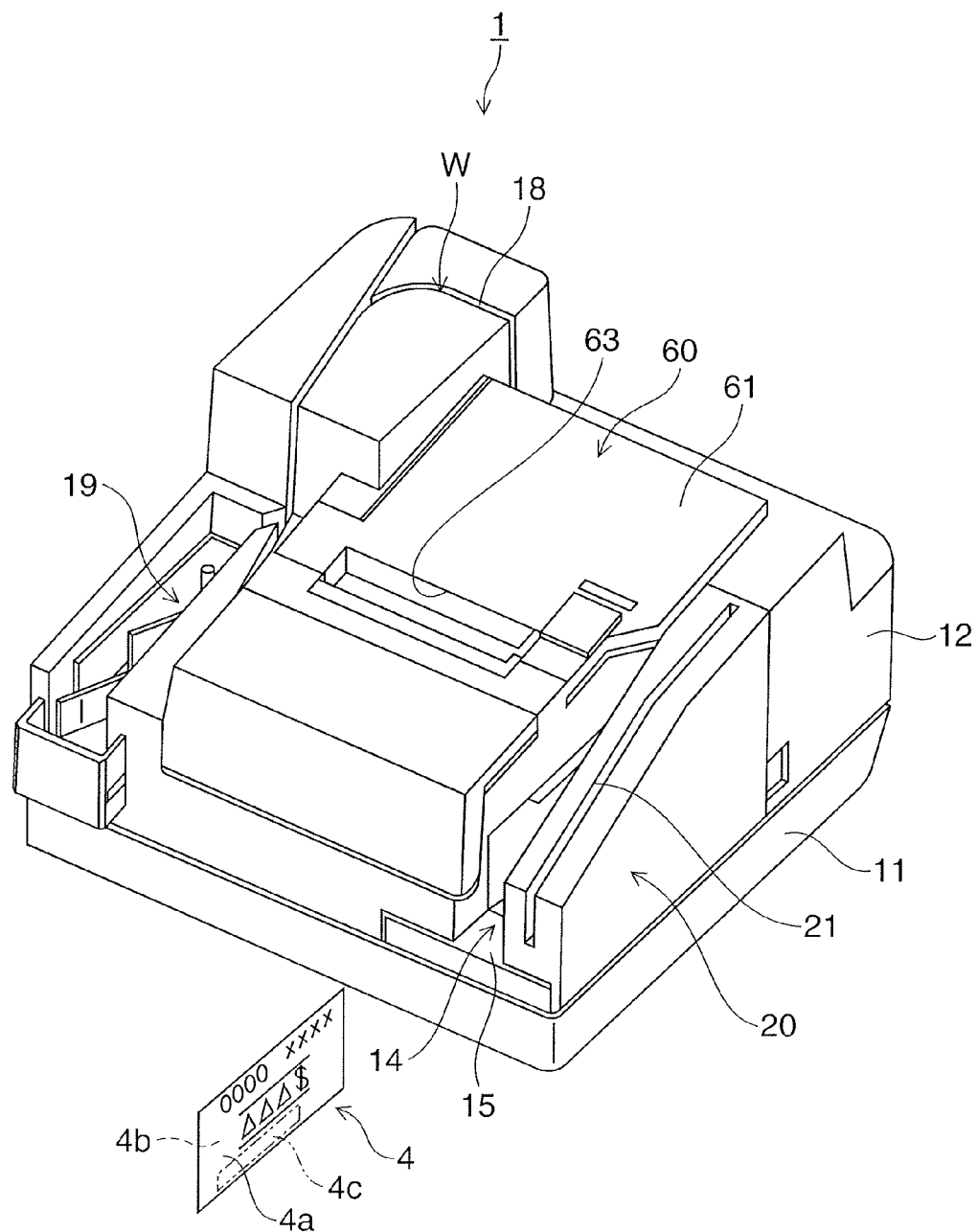
FIG. 1 is an external oblique view of a multifunction device according to a preferred embodiment of the invention.

FIG. 1 is an oblique view of a multifunction device 1 (recording device) according to a first embodiment of the invention. The multifunction device 1 is a device that can process sheet media such as checks 4 and other forms in multiple ways, including reading magnetic ink characters recorded on the medium, optically imaging (scanning) both sides of the medium, and recording (printing) images on the medium.

The multifunction device 1 also functions as a card reader that reads magnetic information recorded on card media such as credit cards, and functions to produce tickets with an image recorded thereon by recording an image to thermal roll paper and cutting the paper.

This embodiment of the invention describes processing checks 4 as an example of the processed medium.

As shown in FIG. 1, a check 4 is a form having a payment amount, payee, serial number, payer signature, and other information printed or recorded on a sheet with a specific colored or patterned background. The payment amount, payee, serial number, payer signature, and other information are recorded on the face 4a, and an endorsement area is provided on the back 4b of the check 4. A specific endorsement image is recorded in the endorsement area by an inkjet head 10 (recording head) described below. An MICR line 4c is printed along the length of the check 4 on the face 4a. The MICR line 4c is a line of magnetic ink characters printed with magnetic ink, and can be read magnetically and optically.

The lengths of the short and long sides of a check 4 are standardized, but can be of various different sizes because there are different standards. The multifunction device 1 defines a maximum check size that includes substantially all commonly used sizes of checks 4, and can process any check 4 within this maximum size.

The outside case of the multifunction device 1 includes a bottom case 11 that covers the bottom part of the multifunction device 1, and a cover 12 that covers the bottom case 11, and the main unit 13 (FIG. 2) of the multifunction device 1 is housed inside this outside case. An entrance 14 for inserting checks 4 is open at the front of the multifunction device 1, and a stacker 15 that can hold a stack of plural checks 4 is provided inside the entrance 14. The stacker 15 can be pulled out to the front, and the checks 4 can be loaded into the stacker 15 after adjusting the stacker 15 to the size of the checks 4 to be stored in the stacker 15.

A slot 18 that is substantially U-shaped when seen from above and is used as the conveyance path W of the checks 4 is formed in the cover 12. The slot 18 communicates with the stacker 15, and the slot 18 communicates with an exit pocket 19 at the front of the multifunction device 1. Checks 4 stored in the stacker 15 are fed one by one into the multifunction device 1 as described below, are processed as they pass through the slot 18, and the processed checks 4 are discharged into the exit pocket 19. Multiple checks 4 can accumulate in the exit pocket 19.

As shown in FIG. 1, a magnetic card reader 20 is disposed beside the stacker 15. The magnetic card reader 20 includes a card slot 21 formed in the cover 12, and a MCR (magnetic card reader) head 22 (FIG. 3) disposed facing the card slot 21, and reads information magnetically recorded on cards passing through the card slot 21 with the MCR head 22.

Figure 2:
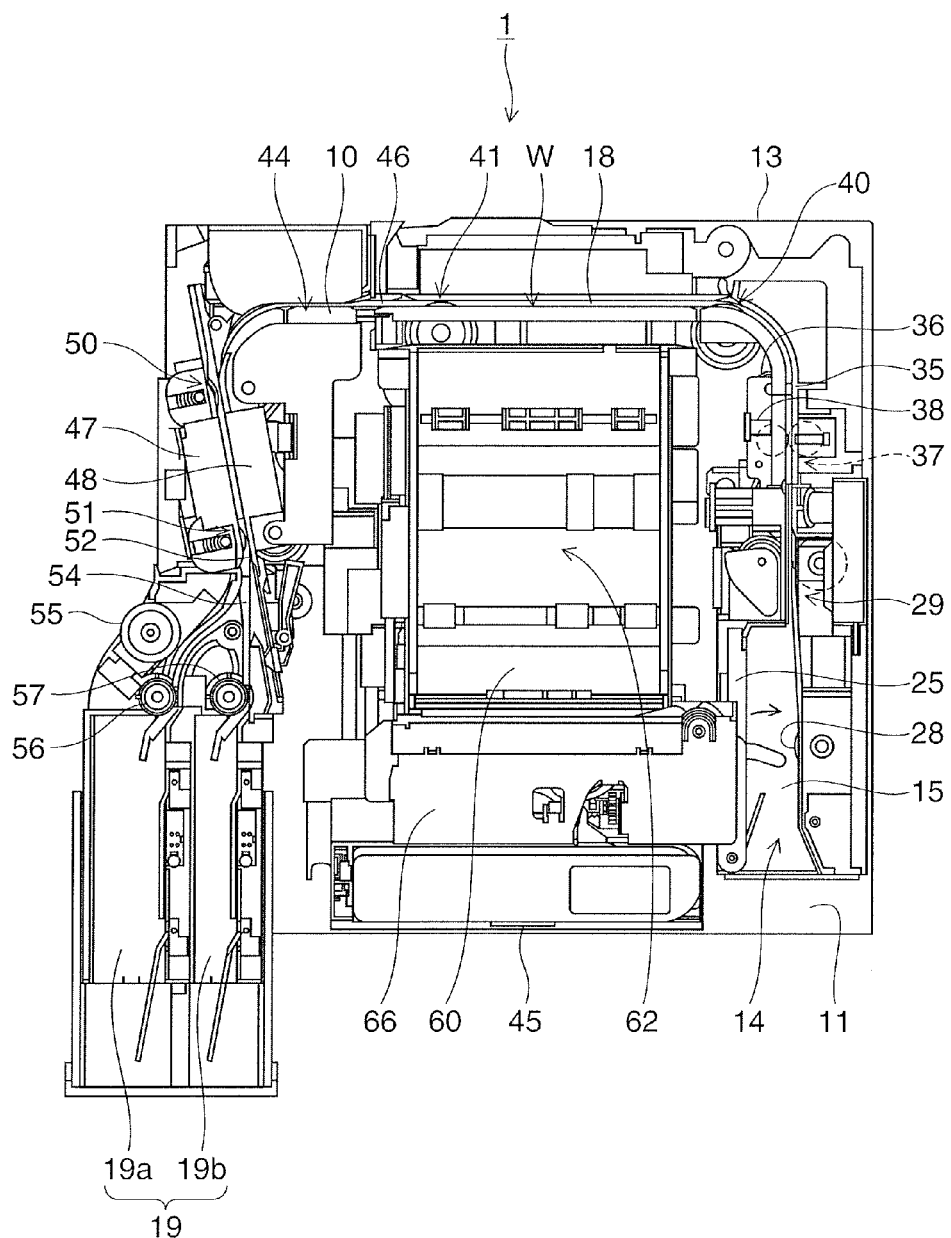
FIG. 2 shows the internal configuration of the multifunction device.

FIG. 2 is a plan view showing the configuration of the main unit 13 of the multifunction device 1 housed the outside case.

As shown in FIG. 2, a hopper 25 is disposed on one side of the stacker 15. The hopper 25 can pivot in the direction of the arrow by means of a hopper drive motor 26 (FIG. 3), and pushes the checks 4 in the stacker 15 to the other side.

A pickup roller 28 driven by an ASF (automatic sheet feeder) motor 27 (FIG. 3) described below is disposed on the other side of the stacker 15, and when the hopper 25 pivots toward the pickup roller 28, one check 4 in the stacker 15 is urged as the hopper 25 pivots to the pickup roller 28, contacts the roller, and is fed into the conveyance path W by rotation of the pickup roller 28.

An ASF roller set 29 composed of a pair of rollers is disposed downstream from the stacker 15. The two rollers of the ASF roller set 29 are disposed on opposite sides of the conveyance path W, one roller is driven by the ASF motor 27, and the other roller is a follower roller. The check 4 in contact with the pickup roller 28 is nipped by the ASF roller set 29, and conveyed downstream through the slot 18.

An ASF paper detector 31 (FIG. 3) is disposed to a specific position in the stacker 15. The ASF paper detector 31 is a transmissive photosensor in this embodiment, and detects if a check 4 is in the stacker 15.

A hopper position detector 32 (FIG. 3) is disposed at the standby position of the hopper 25 in the stacker 15. The hopper position detector 32 is a transmissive photosensor in this embodiment, and detects if the hopper 25 is in the standby position.

A MICR (magnetic ink character recognition) head 35 that contacts the face 4a of the check 4 and magnetically reads the MICR line 4c (FIG. 1) is disposed downstream from the ASF roller set 29. A MICR roller 36 is disposed opposite the MICR head 35. The MICR roller 36 is pushed to the MICR head 35 side, rotates while pressing the check 4 against the MICR head 35, and conveys checks 4 at a constant speed suited to reading the MICR line. An assist roller set 37 composed of a pair of rollers that guide the check 4 fed by the ASF roller set 29 to the MICR head 35 is disposed on the upstream side of the MICR head 35.

A paper length detector 38 (sensor) is disposed to the conveyance path W between the assist roller set 37 and MICR head 35. The paper length detector 38 is a reflective photosensor in this embodiment, and detects the leading end and trailing end of each check 4 by detecting if a check 4 passing through the conveyance path W is at the detection position. The output signals of the paper length detector 38 are acquired by the control unit 70. The media length detector 70b described below determines the length of the check 4 in the conveyance direction based on change in the output from the paper length detector 38.

The conveyance direction as used herein is the direction from the stacker 15 to the exit pocket 19, and unless a specific exception applies, the multifunction device 1 according to this embodiment of the invention processes each check 4 while conveying the check 4 in this conveyance direction.

A first conveyance roller set 40 including a pair of rollers disposed on opposite sides of the conveyance path W is disposed to the conveyance path W on the downstream side of the MICR head 35, and a second conveyance roller set 41 is disposed downstream from the first conveyance roller set 40. The first conveyance roller set 40 and second conveyance roller set 41 are driven rotationally by a conveyance motor 42 (FIG. 3), and these rollers convey the check 4 to the inkjet printer unit 44.

The inkjet printer unit 44 has an inkjet head 10. The inkjet head 10 is an inkjet recording head that is supplied with ink from an ink cartridge 45 installed in the front part of the main unit 13 and ejects ink onto the check 4. The inkjet head 10 is an inkjet line head with the nozzle row extending widthwise to the check 4. When recording on a check 4, ink is ejected from the stationary inkjet head 10 onto the back 4b of the check 4 conveyed at a constant speed, and an image is recorded. The image recorded on the back 4b of the check 4 is an endorsement including text or symbols.

An intermediate detector 46 is disposed on the upstream side of the inkjet head 10 between the inkjet head 10 and second conveyance roller set 41. The intermediate detector 46 is a reflective photosensor in this embodiment, and detects if a check 4 is at the detection position.

A CIS (contact image sensor) unit for optically reading checks 4 is disposed downstream from the inkjet head 10. This CIS unit includes a front CIS unit 47 for imaging the face 4a of the check 4, and a back CIS unit 48 for imaging the back 4b, and can thus optically image both sides of each check 4. The front CIS unit 47 and back CIS unit 48 are disposed on opposite sides of the conveyance path W. A first CIS roller 50 is disposed on the upstream side and a second CIS roller 51 is disposed on the downstream side of these units. The first CIS roller 50 and second CIS roller 51 are rollers that are driven rotationally by the conveyance motor 42, and checks 4 are conveyed by these rollers at a constant speed while being imaged by the CIS units.

A discharge detector 52 is located downstream from the second CIS roller 51. The discharge detector 52 is a reflective photosensor in this embodiment, and detects if a check 4 is at the detection position.

The exit pocket 19 described above is located downstream from the front CIS unit 47 and back CIS unit 48. The exit pocket 19 is divided into a main pocket 19a and a sub-pocket 19b, and the slot 18 splits and is connected to both the main pocket 19a and sub-pocket 19b. The main pocket 19a and sub-pocket 19b can each hold a plurality of checks 4.

A flapper 54 that switches the exit pocket 19 into which the check 4 is discharged to the main pocket 19a or sub-pocket 19b is disposed at the position where the slot 18 splits. The flapper 54 is a guide that by closing the path to the main pocket 19a or the path to the sub-pocket 19b guides the check 4 into the other pocket, and is driven by the flapper drive motor 55.

A discharge roller 56 is disposed to the path from the flapper 54 to the main pocket 19a, another discharge roller 57 is disposed to the path from the flapper 54 to the sub-pocket 19b, and the checks 4 are thus smoothly discharged by these rollers and guided by the flapper 54 into the appropriate exit pocket 19.

As described below, the multifunction device 1 discharges the check 4 into the main pocket 19a when the check 4 is determined to have been correctly loaded based on the result of the MICR head 35 reading the MICR line 4c, and into the sub-pocket 19b when the check 4 is determined to have not been correctly loaded.

As shown in FIG. 1 and FIG. 2, a thermal printer unit 60 for printing tickets with an image recorded thereon is provided in the middle of the multifunction device 1.

A shown in FIG. 1, the thermal printer unit 60 has a printer cover 61 covering the top of the unit. This printer cover 61 is attached to the cover 12 so that the printer cover 61 can open and close freely. When the printer cover 61 is open, a roll paper compartment 62 (FIG. 2), which is a space for holding thermal roll paper, is exposed and the thermal roll paper can be installed or replaced. A paper exit 63 is formed in the printer cover 61, and the thermal roll paper held in the roll paper compartment 62 can be discharged through the paper exit 63.

The thermal printer unit 60 includes a roller platen (not shown in the figure) that supplies and feeds thermal roll paper from the roll paper compartment 62 through the conveyance path, a thermal head 65 (FIG. 3) disposed opposite the platen, and a cutter unit 66 that cuts the thermal roll paper perpendicularly to the conveyance direction. To produce a ticket, the thermal printer unit 60 records an image on the thermal roll paper with the thermal head 65 while driving the platen and conveying the thermal roll paper in the conveyance direction, and then cuts the thermal roll paper at a specific position with the cutter unit 66 to produce a ticket.

Figure 3:
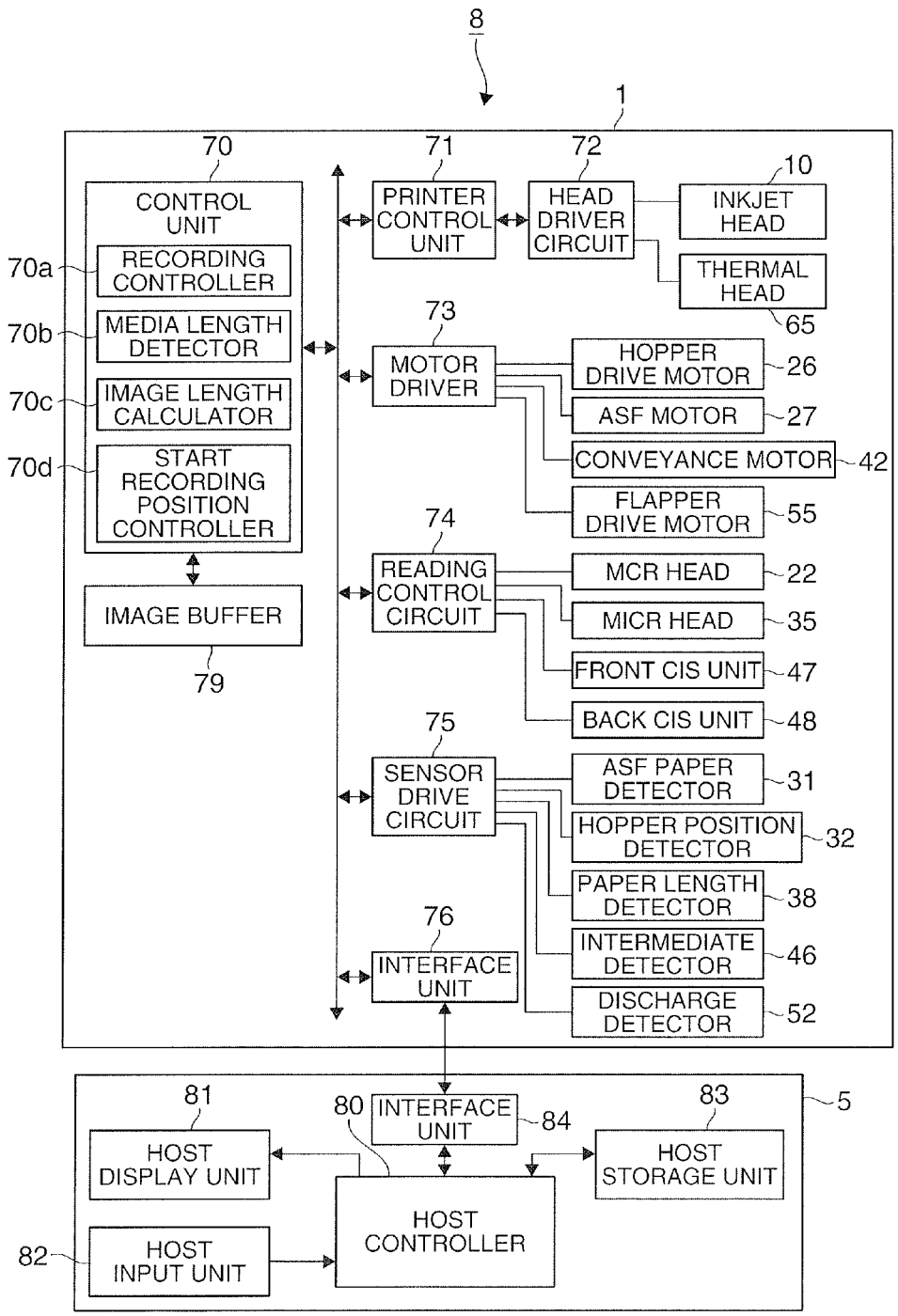
FIG. 3 is a block diagram showing the configuration of the multifunction device and host computer.

FIG. 3 is a block diagram showing the functional configuration of a media processing system 8 composed of the multifunction device 1 connected to a host computer 5 (control device).

As shown in FIG. 3, the host computer 5 has a host controller 80, host display unit 81, host input unit 82, host storage unit 83, and interface unit 84.

The host controller 80 includes a CPU, RAM, and other peripheral circuits, and centrally controls other parts of the host computer 5.

The host display unit 81 is a display panel such as an LCD panel, and displays information as controlled by the host controller 80 on the display panel.

The host input unit 82 is connected to input devices such as a mouse and keyboard, detects operation of the input devices, and outputs to the host controller 80.

The host storage unit 83 includes a hard disk drive or nonvolatile memory such as EEPROM, and nonvolatilely stores programs and data. The interface unit 84 communicates with the multifunction device 1 according to a known communication standard as controlled by the host controller 80.

As also shown in FIG. 3, the multifunction device 1 includes a control unit 70, printer control unit 71, head driver circuit 72, motor driver 73, reading control circuit 74, sensor drive circuit 75, and interface unit 76 connected to communicate with each other.

The control unit 70 centrally controls the multifunction device 1, and includes a CPU, ROM, RAM, and other peripheral circuits. The control unit 70 controls other parts of the multifunction device 1 by means of the CPU reading and running firmware stored in ROM. An image buffer 79 is connected to the control unit 70. This control unit 70 is a buffer created in RAM or other type of volatile memory, and is described in further detail below.

The printer control unit 71 centrally controls the inkjet printer unit 44 and the thermal printer unit 60. The printer control unit 71 supplies drive current to the inkjet head 10 through the head driver circuit 72 to record an image on a check 4 as controlled by the control unit 70. The printer control unit 71 also supplies drive current to the thermal head 65 through the head driver circuit 72 to record on thermal roll paper as controlled by the control unit 70.

The motor driver 73 is connected to the hopper drive motor 26 and causes the hopper 25 to pivot as controlled by the control unit 70. The motor driver 73 also conveys a check 4 stored in the stacker 15 through the conveyance path W by outputting drive pulses to the ASF motor 27, and driving the pickup roller 28 and ASF roller set 29 connected to the motors as controlled by the control unit 70.

The motor driver 73 is connected to the conveyance motor 42, and conveys a check 4 through the conveyance path W by outputting drive pulses to the conveyance motor 42 to operate the motor and drive the assist roller set 37, first conveyance roller set 40, second conveyance roller set 41, first CIS roller 50, and second CIS roller 51 as controlled by the control unit 70. In this embodiment the conveyance motor 42 is a stepper motor, and the control unit 70 can manage the conveyance distance of the check 4 through the conveyance path W by managing the number of steps the conveyance motor 42 turns.

In this embodiment of the invention the members, mechanisms, and devices related to conveying a check 4, including the conveyance motor 42, the rollers that are driven by the conveyance motor 42, and the motor driver 73, work together and function as a conveyance unit that conveys a check 4 (medium) in the conveyance direction (or the opposite direction) through the conveyance path W.

The motor driver 73 is also connected to the flapper drive motor 55, outputs drive pulses to the motor and drives the motor as controlled by the control unit 70 to switch the flapper 54 to the main pocket 19a side or the sub-pocket 19b side.

The reading control circuit 74 is connected to the MCR head 22, MICR head 35, front CIS unit 47, and back CIS unit 48. The reading control circuit 74 causes the MCR head 22 to read the magnetic information when a card is swiped through the card slot 21 (FIG. 1), and digitizes and outputs the read signal output from the MCR head 22 to the control unit 70 as controlled by the control unit 70.

The reading control circuit 74 also reads magnetic information with the MICR head 35, and digitizes and outputs the read signal output from the MICR head 35 to the control unit 70 as controlled by the control unit 70.

As also controlled by the control unit 70, the reading control circuit 74 drives the front CIS unit 47 and back CIS unit 48 to scan the face 4a and back 4b of the check 4, and then digitizes the signals output from the front CIS unit 47 and back CIS unit 48 and outputs to the control unit 70.

The sensor drive circuit 75 is connected to the ASF paper detector 31, hopper position detector 32, paper length detector 38, intermediate detector 46, and discharge detector 52, supplies current to these detectors, gets the output values therefrom at specific times, and digitizes and outputs the acquired detection values to the control unit 70.

The interface unit 76 is connected to the host computer 5 by wire or wirelessly, and exchanges data with the host computer 5 according to a known protocol as controlled by the control unit 70.

The basic operation of the multifunction device 1 when processing a check 4 is described below.

As described above, multiple checks 4 can be stored in the stacker 15. The multifunction device 1 according to this embodiment of the invention sequentially feeds the plural checks 4 in the stacker 15 through the conveyance path W at a specific timing, and can continuously perform the process described below on each check 4.

Figure 4:
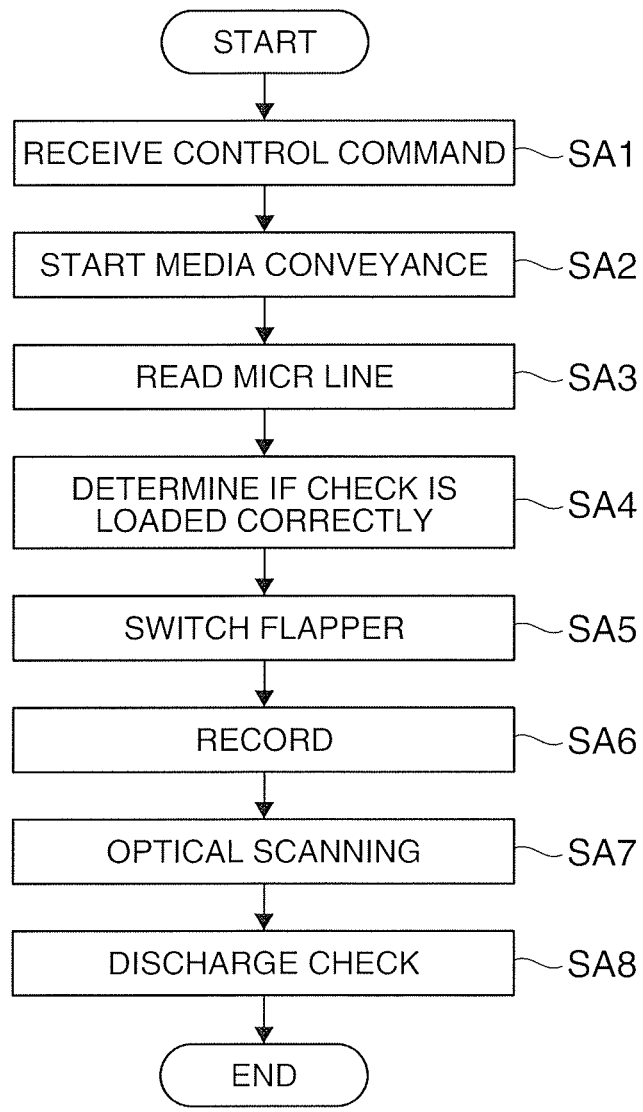
FIG. 4 is a flow chart of the operation of the multifunction device.

FIG. 4 is a flow chart showing the process applied to a single check 4.

The operation described below assumes that the following sequence of steps is executed sequentially as a result of control commands for executing the steps being output without delay from the host computer 5 to the multifunction device 1 at the appropriate timing, and the control unit 70 of the multifunction device 1 reading and executing the control commands.

The function of the control unit 70 described below is achieved by the cooperation of hardware and software, such as a CPU reading and running firmware.

As shown in FIG. 4, when a command to start processing a check 4 is received from the host computer 5 (step SA1), the control unit 70 of the multifunction device 1 drives the hopper drive motor 26 and ASF motor 27 while monitoring the output values of the hopper position detector 32 and ASF paper detector 31, feeds one of the checks 4 stored in the stacker 15 into the conveyance path W, and starts check 4 conveyance (step SA2).

Next, the control unit 70 reads the MICR line 4c of the check 4 with the MICR head 35 while managing the position of the check 4 by monitoring the output from the paper length detector 38 (step SA3).

The control unit 70 then determines if the check 4 was loaded correctly instead of backwards top-bottom or front-back based on the output of the MICR head 35 (step SA4). More specifically, the control unit 70 applies magnetic ink character recognition to the magnetic ink characters in the MICR line 4c by comparing the waveforms obtained by reading the magnetic ink characters with standard waveforms, and determines if the check 4 was loaded correctly or not based on whether or not magnetic ink character recognition is successful.

Next, the control unit 70 drives the flapper drive motor 55 to switch the flapper 54 based on the result from step SA4 (step SA5). More specifically, if the check 4 was loaded correctly, the control unit 70 switches the flapper 54 to the main pocket 19a side, and if the check 4 was not loaded correctly, the control unit 70 switches the flapper 54 to the sub-pocket 19b side. Note that steps SA4 and SA5 could run parallel to steps SA6 and SA7 described below.

Next, the control unit 70 drives the rollers by driving the conveyance motor 42 to convey the check 4 while monitoring the position of the check 4 by monitoring output from the intermediate detector 46, and records a specific image on the back 4b of the check 4 with the inkjet head 10 (step SA6). Note that if the check 4 was not loaded correctly, recording an image in step SA6 may be skipped.

The control unit 70 then scans the face 4a of the check 4 with the front CIS unit 47 while scanning the back 4b with the back CIS unit 48, and outputs the results of scanning to the host computer 5 (step SA7). Note that if the check 4 was not loaded correctly, scanning in step SA7 may be skipped.

The control unit 70 then drives the rollers by driving the conveyance motor 42 to discharge the check 4 into the exit pocket 19 while monitoring whether or not the check 4 was discharged correctly by monitoring the output of the discharge detector 52 (step SA8). The check 4 is guided at this time by the flapper 54 into the appropriate exit pocket 19, that is, the main pocket 19a or sub-pocket 19b, based on the result of reading by the MICR head 35.

Operation of the multifunction device 1 when recording an image on a check 4 using the inkjet head 10 is described next.

FIG. 5 shows an example of the back 4b (recording surface) of a check 4.

The check 4 is loaded so that when the check 4 is conveyed through the conveyance path W, the top edge 4f as seen in the figure is up, the bottom edge 4g is down, and the check 4 is conveyed to the left as shown by the arrow in FIG. 5 with the leading edge 4d at the front. The leading end of the check 4 in the conveyance direction is thus the leading edge 4d, and the opposite end is the trailing edge 4e. The length in the conveyance direction is also referred to herein as simply the length.

FIG. 6 is used to describe operation when recording an image on a check 4, and schematically shows the part of the conveyance path W in the vicinity of the inkjet head 10.

Figure 6A:
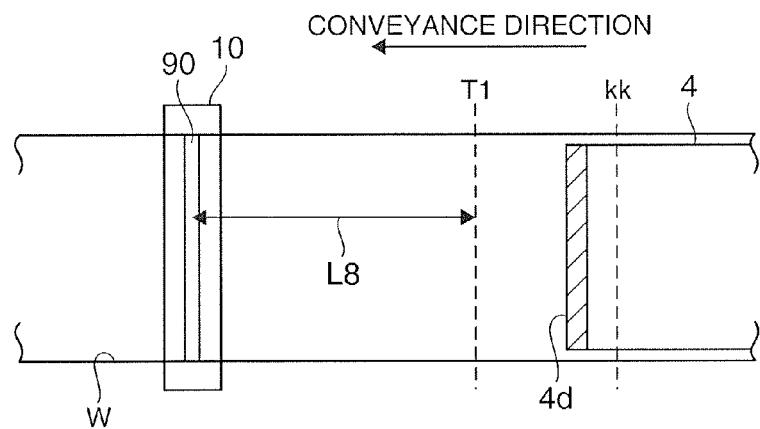
FIG. 6A, 6B, 6C and 6D are used to describe operation when recording an image on a check.

More specifically, FIG. 6A shows the location of the inkjet head 10 on the conveyance path W and the nozzle row 90 formed in the inkjet head 10 with the conveyance path W arranged so that the conveyance direction goes from right to left in the figure. The detection position T1 where the presence of a check 4 is detected by the intermediate detector 46 (FIG. 2) is on the upstream side of the inkjet head 10 in the conveyance direction as also shown in FIG. 6A. These positions are the same in FIG. 6B to FIG. 6D.

The nozzle row 90 is formed with a plurality of nozzles in a line extending in a direction intersecting the conveyance direction. When recording an image, ink is discharged at the appropriate timing from the appropriate nozzles in the nozzle row 90 to form dots on the check 4 being conveyed at a constant speed through the conveyance path W.

As shown in FIG. 5, a leading margin M1 is formed at a position relative to the leading edge 4d of the check 4, and a trailing margin M2 is formed at a position relative to the trailing edge 4e. These margins are areas where image recording is prohibited, the length of the leading margin M1 is L1, and the length of the trailing margin M2 is L2. L1 and L2 may be constants or values that are set in advance.

The area on the back 4b of the check 4 minus the leading margin M1 and trailing margin M2 is the area where image recording is possible, referred to as the "recordable area" herein, and the length of this recordable area is L3. As known from the literature, checks 4 may vary in size, and this length L3 therefore depends on the individual check 4.

As shown in FIG. 5, the recordable area is divided between the leading edge 4d to the trailing edge 4e into three sections, area A1, area A2, and area A3, bounded in order by boundaries Q1, Q2, Q3, Q4. Information with different purposes is recorded in these areas A1 to A3 according to the standard that applies to the particular check 4. The length of area A1 and the length of area A3 are determined by the applicable standard and are constant irrespective of the check 4 size, the length of area A1 is L4, and the length of area A3 is L5. The length of area A2 is L6, and length L6 is obtained by subtracting the length L4 of area A1 and the length L5 of area A3 from the length L3 of the recordable area. The length L6 of area A2 thus varies and depends upon the check 4.

The start recording position KK is preset when recording an image on a check 4. This start recording position KK is the position where recording an image starts. While conveying the check 4 at a constant speed in the conveyance direction, the multifunction device 1 starts ejecting ink from the nozzle row 90 to record an image when the start recording position KK reaches a position corresponding to the nozzle row 90.

The start recording position KK is set in this embodiment by setting a distance (L7) from the trailing end (boundary Q1) of the leading margin M1. More specifically, distance L7 can be set as desired in this embodiment, and the start recording position KK is set by setting this distance L7. As further described below, the method of setting the start recording position KK (method of determining the value of distance L7) is a unique feature of this multifunction device 1.

To record an image on the check 4, image data representing the image to be recorded on the check 4 is input from the host computer 5. This image data is data storing gray scale information related to the color of each pixel in the image. To record an image on the check 4, the recording controller 70a of the control unit 70 creates an image buffer 79 according to the size of the image data for the image in RAM or other memory device, generates print data by applying a specific image process to the image data, and writes the print data to the image buffer 79.

The operation of recording an image on a check 4 is described below with reference to FIG. 6.

Note that as shown in FIG. 6 the distance between the nozzle row 90 and the detection position T1 of the intermediate detector 46 is distance L8.

The function of the recording controller 70*a* is achieved by the cooperation of hardware and software, such as the CPU reading and executing firmware.

As shown in FIG. 6A, the recording controller 70*a* of the control unit 70 first drives the conveyance motor 42 and conveys the check 4 through the conveyance path W at a constant speed in the conveyance direction.

As check 4 conveyance continues, the recording controller 70*a* detects when the leading edge 4*d* of the check 4 reaches the detection position T1 (see FIG. 6B), and thereafter manages the conveyance distance of the check 4, based on the output value of the intermediate detector 46. As described above, the conveyance motor 42 is a stepper motor, the number of steps turned by the stepper motor is proportional to the conveyance distance of the check 4, and the recording controller 70*a* can therefore manage the conveyance distance of the check 4 by managing the number of steps the conveyance motor 42 turns. The relationship between the number of steps and the conveyance distance may be stored in a lookup table that can be referenced by the program (firmware, for example) rendering the function of the recording controller 70*a*, or defined in the program.

Figure 6B:
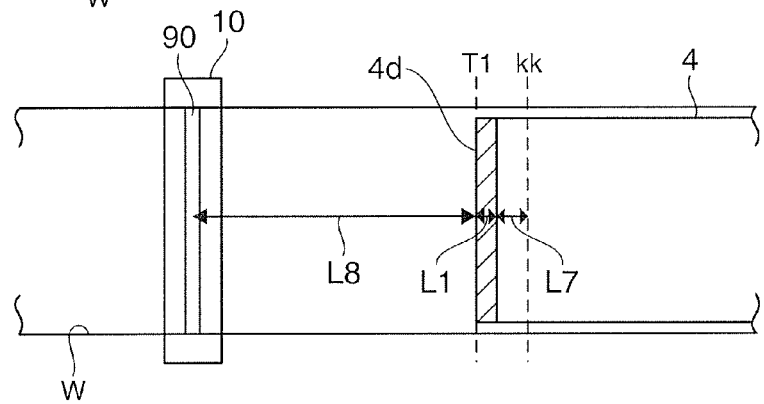
Figure 6C:
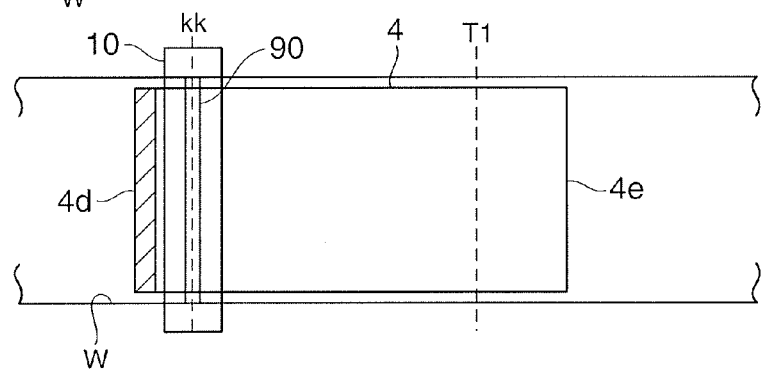
Figure 6D:
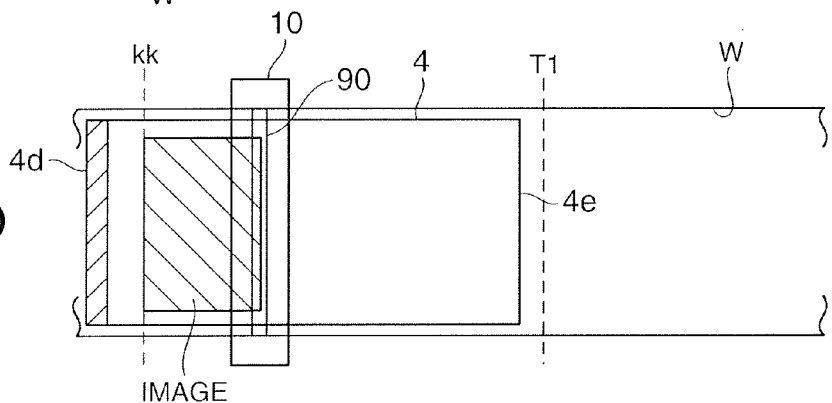

After the leading edge 4*d* of the check 4 reaches the detection position T1, the recording controller 70*a* monitors if the start recording position KK has reached the position corresponding to the nozzle row 90 while continuing to convey the check 4 in the conveyance direction as described below. That is, as shown in FIG. 6B, the distance between the nozzle row 90 and the start recording position KK when the leading edge 4*d* of the check 4 reaches the detection position T1 is L8+L1+L7. The recording controller 70*a* therefore determines if the conveyance distance of the check 4 after the leading edge 4*d* reached the detection position T1 is equal to the sum L8+L1+L7, and knows that the start recording position KK is at the position corresponding to the nozzle row 90 when the conveyance distance equals this value.

When the recording controller 70*a* determines that the start recording position KK on the check 4 reached the position corresponding to the nozzle row 90 (shown in FIG. 6C), the recording controller 70*a* starts recording the image by ejecting ink from the nozzle row 90. After image recording starts, the recording controller 70*a* continues conveying the check 4 at a constant speed while driving the head driver circuit 72 based on the print data written to the image buffer 79 to eject ink at the appropriate timing from the appropriate nozzles in the nozzle row 90, and forms the dots that create the image on the back 4*b* of the check 4 (shown in FIG. 6D).

An image is thus recorded on the check 4.

As described above, the recordable area of the check 4 is divided into three areas, area A1, area A2, and area A3 (see FIG. 5). Information used for different purposes is respectively recorded in area A1, area A2, and area A3 according to the applicable check 4 standard. An image may therefore be selectively recorded in any one of these three areas when an image is recorded on the check 4.

Recording an image in area A3 is considered in the example below.

In order to record an image in area A3, distance L7 must be set appropriately so that the image is recorded in area A3 because image recording starts from the start recording position KK in this embodiment as described above.

Furthermore, because all checks 4 are not the same size, distance L7 may change according to the check 4, and if the user must input a value for distance L7 every time an image is recorded in area A3, check processing becomes extremely tedious. These considerations also apply to recording an image in area A2.

To solve the foregoing problem, the multifunction device 1 according to this embodiment of the invention operates as described below.

Figure 7:
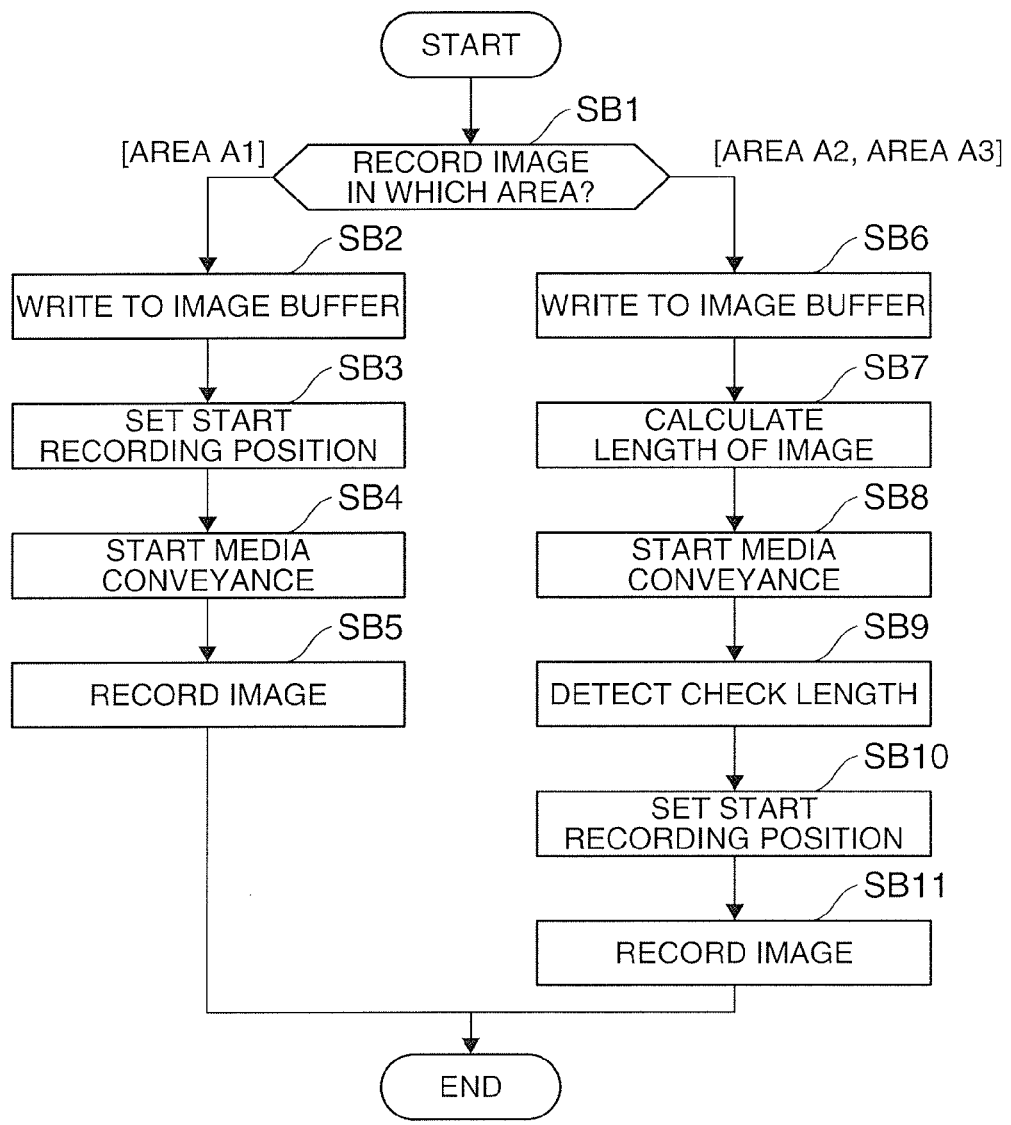
FIG. 7 is a flow chart of the operation of the multifunction device.

FIG. 7 is a flowchart of the operation whereby the multifunction device 1 according to this embodiment of the invention records an image on a check 4.

The functions of the media length detector 70*b*, image length calculator 70*c*, and start recording position controller 70*d* below are achieved by the cooperation of hardware and software, such as by the CPU of the control unit 70 reading and executing firmware.

Note that in the operation described below the multifunction device 1 only records an image on one check 4 stored in the stacker 15, and does not perform other processes such as reading magnetic ink characters. When the following operation starts, conveyance of the check 4 to be processed has not started, and the check 4 is stored in the stacker 15.

The operation of the multifunction device 1 described below also uses recording an image in any one of areas A1 to A3 as an example.

In addition, the control commands for performing the operations related to recording an image on a check 4 stored in the stacker 15 are assumed to be output as needed at the appropriate timing from the host computer 5 to the multifunction device 1. These control commands include at least image data for the image to be recorded on the check 4, and information identifying in which of areas A1 to A3 the image should be recorded. In order to record an image in any of areas A1 to A3 in this embodiment, the user simply determines and inputs to the host computer 5 which of areas A1 to A3 to record the image in, and does not need to set the start recording position KK by setting a specific value for distance L7 before printing. A user interface for inputting the area is provided by a function of the device driver installed on the host computer 5 to facilitate input.

As shown in FIG. 7, to record an image on the check 4, the recording controller 70*a* of the control unit 70 of the multifunction device 1 first determines based on a control command input from the host computer 5 which of the areas A1 to A3 formed on the back 4*b* of the check 4 to record the image in (step SB1).

To Record the Image in Area A1

If recording the image in area A1 is determined instep SB1 (step SB1 returns area A1), the recording controller 70*a* creates an image buffer 79 in a specific memory area, and writes the image data for the image to be recorded as print data in the image buffer 79 (step SB2).

Next, the recording controller 70*a* sets the start recording position KK by setting distance L7 to a predetermined constant (step SB3).

Figure 8A:
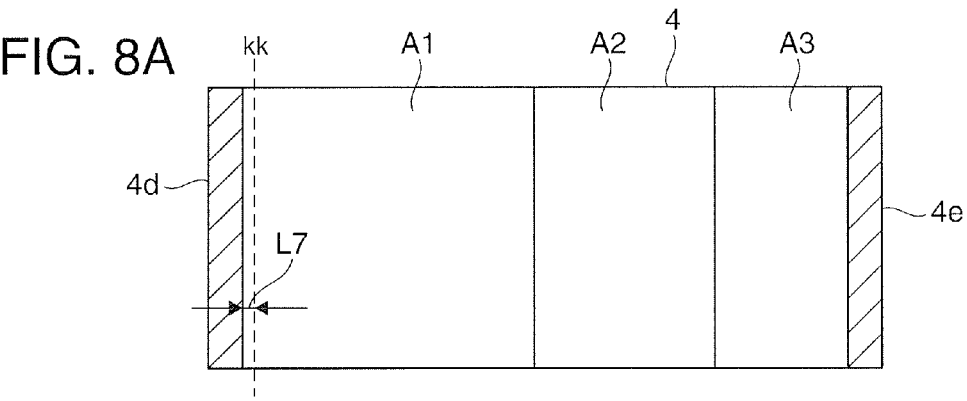
FIGS. 8A, 8B and 8C shows the start recording position.

FIG. 8A shows an example of the start recording position KK set in step SB3. As shown in FIG. 8A, the value of distance L7 set in step SB3 is extremely small compared with the length L4 of area A1, and boundary Q1 and the start recording position KK are therefore close together.

The reason distance L7 is set to a constant value when recording the image in area A1 is described below. Specifically, to record an image in area A1, the start recording position KK can be simply set to a position corresponding to boundary Q1, which is the leading end of area A1. There is also no need to adjust the value of distance L7 according to the size of the check 4 in order to set the start recording position KK to a position corresponding to boundary Q1 because the length L1 of leading margin M1 is predetermined and does not vary according to the size of the check 4.

After setting the start recording position KK, the recording controller 70a controls the related mechanisms to feed a check 4 from the stacker 15 into the conveyance path W and start check 4 conveyance (step SB4), and then records the image on the check 4 (step SB5) using the operation described in FIG. 6.

To Record an Image in Area A2 or Area A3

If recording the image in area A2 or area A3 is determined in step SB1 (step SB1 returns area A2 or area A3), the recording controller 70a creates an image buffer 79 in a specific memory area, and writes the image data for the image to be recorded as print data in the image buffer 79 (step SB6).

Based on the image data written to the image buffer 79, the image length calculator 70c then calculates the length L9 of the image (see FIG. 8B and FIG. 8C) when the image is recorded to the check 4 (step SB7). For example, because the number of dots in the direction corresponding to the conveyance direction of the image data can be acquired from the image data written to the image buffer 79, and the physical distance between adjacent dots is uniformly determined according to the image resolution, the image length calculator 70c can acquire the appropriate information for the dots in the image, and calculate the length L9 of the image therefrom. The method of calculating the image length (length L9) is not limited to the foregoing, and any desirable method can be used.

The recording controller 70a then controls the related mechanisms to feed a check 4 from the stacker 15 into the conveyance path W and start check 4 conveyances (step SB8). As will be understood from the arrangement of parts along the conveyance path W shown in FIG. 1, after conveyance starts the check 4 will pass the position corresponding to the paper length detector 38 before reaching the inkjet head 10.

While the check 4 is conveyed, the media length detector 70b detects the length L10 of the check 4 (FIG. 5) based on output from the paper length detector 38 (step SB9). More specifically, the media length detector 70b monitors and saves the number of steps the conveyance motor 42 turns while the check 4 is sensed by the paper length detector 38, that is, until the trailing edge 4e of the check 4 is detected after the leading edge 4d is detected by the paper length detector 38. The number of steps acquired here is the number of steps corresponding to the conveyance distance equal to the length L10 of the check 4 (the length from the leading edge 4d to the trailing edge 4e). The media length detector 70b then determines the length L10 of the check 4 by converting the acquired number of steps to length.

The start recording position controller 70d then sets the start recording position KK according to the area where the image should be recorded (area A2 or area A3). As described below, the operation of the start recording position controller 70d in step SB10 differs when recording the image in area A3 and when recording the image in area A3.

To Record an Image in Area A3

To record an image in area A3, the start recording position controller 70d sets the start recording position KK by determining distance L7 as described below.

As shown in FIG. 5, in the group of areas A1 to A3, area A3 is the area closest to the trailing edge 4e. Therefore, if distance L7 is set so that the image is recorded in area A3 by setting the trailing end of the image to a position corresponding to boundary Q4, the image can be recorded in area A3 while reliably preventing the trailing end of the image from being recorded on the upstream side of boundary Q4 in the conveyance direction. However, because all checks 4 are not the same size, the value of distance L7 that positions the trailing end of the image desirably to boundary Q4 depends upon the specific check 4.

The start recording position controller 70d therefore sets the value of distance L7 for recording an image in area A3 based on the length L9 of the image to be recorded on the check 4 that was calculated in step SB7, and the length L10 of the check 4 detected in step SB9. This is further described below.

Figure 8B:
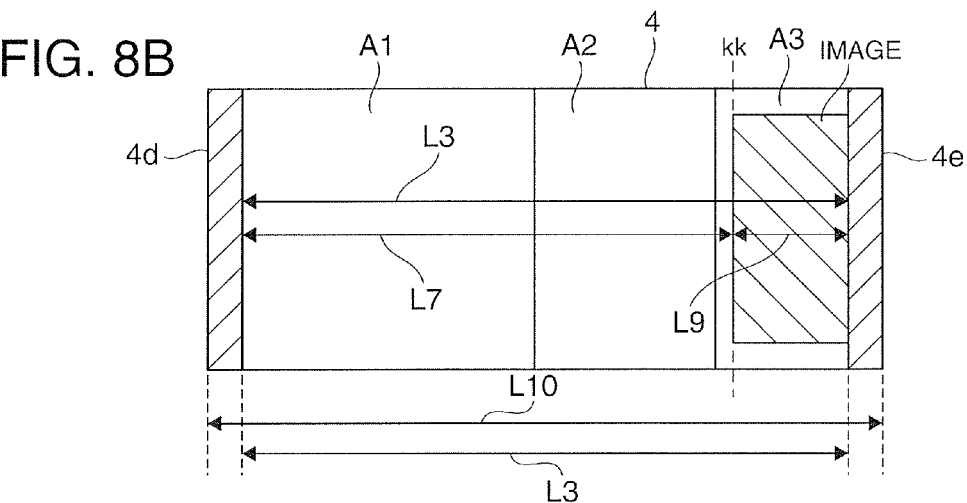

FIG. 8B describes a preferred method of setting the value of distance L7 to record an image in area A3.

To set distance L7, the start recording position controller 70d first calculates the length L3 of the recordable area. The value of length L3 is the difference of the check 4 length L10 detected in step SB9 minus the sum of the leading and trailing margins L1 and L2.

Next, the start recording position controller 70d obtains the difference of length L3 minus the image length L9 calculated in step SB7, and sets this value (difference) as distance L7.

By thus setting distance L7, the start recording position KK can be set so that the position of the trailing end of the image is at a position corresponding to boundary Q4 based on the actual length of the check 4 and the actual length of the image as shown in FIG. 8B.

It will also be obvious that the value of distance L7 can be set to allow for a slight margin of separation between the trailing end of the image and boundary Q4.

As described above, the multifunction device 1 can record the image to be recorded on the check 4 so that the trailing end of the image is shifted to boundary Q4.

To Record an Image in Area A2

To record an image in area A2, the start recording position controller 70d sets the start recording position KK by determining distance L7 as described below.

As shown in FIG. 5, in the group of areas A1 to A3, area A2 is the area in the middle. Therefore, if distance L7 is set so that the image is recorded in area A2 by setting the trailing end of the image to a position corresponding to boundary Q3, the image can be recorded in area A2 while reliably preventing the image from extending into area A3. However, because all checks 4 are not the same size, the value of distance L7 that positions the trailing end of the image desirably to boundary Q3 depends upon the specific check 4.

The start recording position controller 70d therefore sets the value of distance L7 for recording an image in area A2 based on the length L9 of the image to be recorded on the check 4 that was calculated in step SB7, and the length L10 of the check 4 detected in step SB9. This is further described below.

Figure 8C:
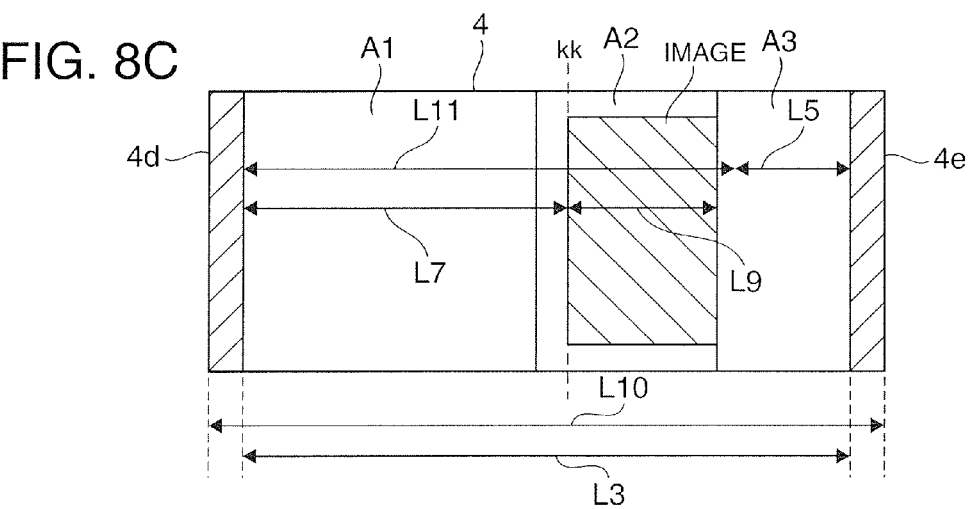

FIG. 8C describes a preferred method of setting the value of distance L7 to record an image in area A3.

To set distance L7, the start recording position controller 70d first calculates the length L11 from boundary Q1 to boundary Q3 (shown in FIG. 5). This length L11 is the difference of the check 4 length L10 detected in step SB9 minus the sum of the leading and trailing margins L1 and L2, minus the length L5 of area A3.

The start recording position controller 70d then calculates the difference of length L11 minus the image length L9 calculated in step SB7, and sets this value (difference) as distance L7.

By thus setting distance L7, the start recording position KK can be set so that the position of the trailing end of the image is at a position corresponding to boundary Q3 based on the actual length of the check 4 and the actual length of the image as shown in FIG. 8C.

It will also be obvious that the value of distance L7 can be set to allow for a slight margin of separation between the trailing end of the image and boundary Q3.

As described above, the multifunction device 1 can record the image to be recorded on the check 4 so that the trailing end of the image is shifted to boundary Q3.

Note that when recording an image in area A2, boundary Q3 functions as the trailing end of the check 4 (trailing end of the media). More specifically, because length L5 of area A3 is constant depending on the standard used for the check 4, the start recording position controller 70d treats boundary Q3 as the trailing edge of the check 4 when recording an image in area A2, and sets the start recording position KK so that the image is recorded with the trailing end of the image at a position corresponding to the boundary Q3 used as the trailing edge.

Note that step SB9 and step SB10 are completed before image recording starts, that is, before the start recording position KK reaches the position of the nozzle row 90. To enable this, the paper length detector 38 and inkjet head 10 are disposed at appropriate positions on the conveyance path W based on the sizes of checks 4 that may be processed in the multifunction device 1 according to this embodiment of the invention.

After setting the start recording position KK in step SB10, the recording controller 70a uses the start recording position KK that was set to record the image on the check 4 according to the operation described in FIG. 6. Images can therefore be recorded at the desired position in area A3 or area A2.

Other Functions

Recording an image on the back 4b of a check 4 is described above, but the multifunction device 1 is not limited to using checks 4, and can record images to any forms of a compatible size.

When recording a single image to a form, the multifunction device 1 according to this embodiment of the invention enables the user to predefine whether to record the image offset toward the leading end of the form, record the image offset toward the trailing end, or record the image centered on the form, and can record the image as specified. The user's selection can be made through a dedicated user interface provided by a function of a device driver installed on the host computer 5, or by operating a switch on the multifunction device 1, for example.

Note that recording an image offset toward the front (leading) end of the form (also referred to as "front adjusted") means positioning the leading end of the image to a position corresponding to the leading end of the form. Recording an image offset toward the back (trailing) end of the form (also referred to as "back adjusted") means positioning the trailing end of the image to a position corresponding to the trailing end of the form. Recording an image centered on the form (also referred to as simply "centered") means recording the image in the middle of the form.

When the image is front adjusted, the start recording position controller 70d sets the start recording position KK in the same way as when recording the image in area A1.

More specifically, with reference to FIG. 8A, the start recording position controller 70d uses a small, predetermined constant value as distance L7, and thereby sets the start recording position KK to a position close to the leading edge of the form (check 4 in the example shown in FIG. 8A). By thus setting the start recording position KK, the leading end of the image is positioned to a position corresponding to the leading end of the form, and the image will be offset toward the front end on the recording surface of the form.

When the image is back adjusted, the start recording position controller 70d sets the start recording position KK in the same way as when recording the image in area A3.

More specifically, with reference to FIG. 8B, the start recording position controller 70d sets the difference of the image length L9 calculated by the image length calculator 70c subtracted from the length L3 of the recordable area calculated based on the length L10 of the check 4 (form) detected by the media length detector 70b as the value of distance L7. By thus setting the start recording position KK, the trailing end of the image is positioned to a position corresponding to the trailing end of the form, and the image will be offset toward the back end on the recording surface of the form.

When the image is centered, the start recording position controller 70d sets the start recording position KK as described below.

Figure 9:
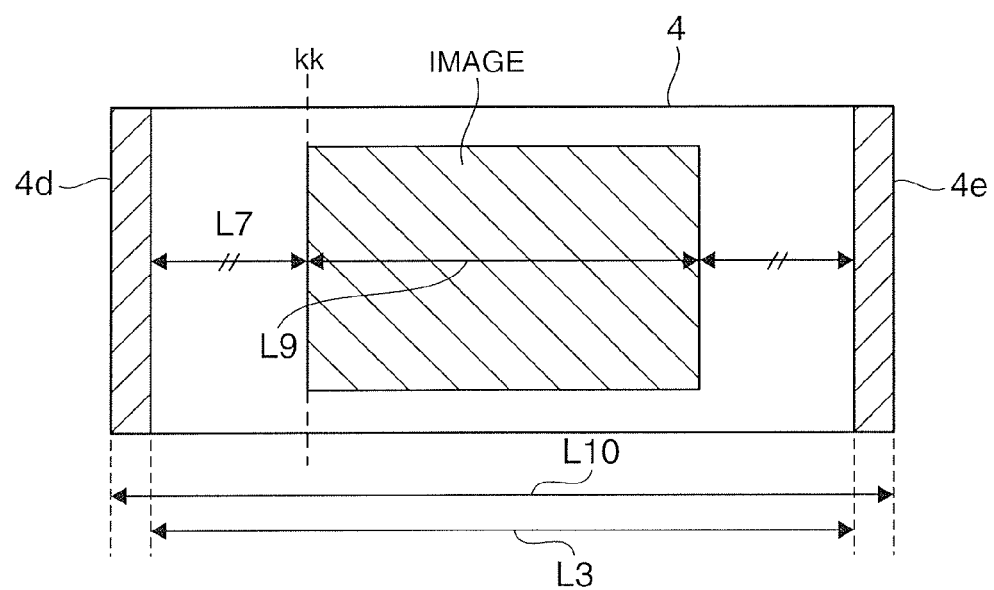
FIG. 9 shows the start recording position when centering the recorded image.

FIG. 9 schematically describes an example of the start recording position KK that is set to record an image centered on the form. FIG. 9 shows an example in which the image is recorded in the middle on the back 4b of the check 4 by recording the image centered.

To center an image, the start recording position controller 70d calculates half the difference of the image length L9 calculated by the image length calculator 70c subtracted from the length L3 of the recordable area calculated based on the length L10 of the check 4 (form) detected by the media length detector 70b (that is, (L3−L9)/2) as the value of distance L7. By thus setting the value of distance L7, the image can recorded in the middle on the back 4b of the check 4 (the recording surface of the form) as shown in FIG. 9.

As described above, the multifunction device 1 according to this embodiment of the invention has an inkjet head 10 disposed to the conveyance path W of the check 4, and a conveyance unit that conveys the check 4 in the conveyance direction on the conveyance path W (a conveyance mechanism including a conveyance motor, for example).

The multifunction device 1 also has a recording controller 70a that writes image data for the image to be recorded on the check 4 to an image buffer 79, controls the inkjet head 10 and conveyance unit based on the buffered image data, starts recording the image from the start recording position KK on the check 4, and records the image on the check 4.

The multifunction device 1 also has a media length detector 70b that detects the length L10 of the check 4 being conveyed by the conveyance unit, an image length calculator 70c that calculates the length L9 of the image to be recorded on the check 4, and a start recording position controller 70d that sets the start recording position KK for recording the image on the check 4 based on the length of the check 4 calculated by the media length detector 70b, and the length of the image to be recorded on the check 4 calculated by the image length calculator 70c.

As a result, the multifunction device 1 can set the start recording position KK for recording an image on the check 4 based on the actual length L10 of the check 4 and the actual length L9 of the image to be recorded on the check 4. The multifunction device 1 can therefore set the start recording position KK to an appropriate position relative to the actual length of the check 4, the actual length of the image to be recorded on the check 4, and the area to which the image should be recorded on the check 4, and can thereby record the image to a suitable position corresponding to the area where the image should be recorded on the check 4 regardless of the size of the check 4.

To record an image in area A3 in this embodiment, the start recording position controller 70d sets the value of distance L7 according to the difference between the length L3 of the recordable area calculated from the length L10 of the check 4, and the length L9 of the image to be recorded on the check 4. As a result, the start recording position controller 70d can set the start recording position KK to a position for recording the image so that the trailing end of the image is positioned to a position corresponding to a position that accommodates a margin from the trailing edge 4e of the check 4.

As a result, when recording an image to area A3 formed at the trailing end of the check 4, the multifunction device 1 can record the image to a suitable position corresponding to the desired area.

When centering is selected, the start recording position controller 70d in this embodiment calculates the distance between the leading end of the image and the leading end of the check 4 allowing for a leading margin when the image is recorded in the middle of the check 4 based on the length L10 of the check 4 and the length L9 of the image to be recorded on the check 4.

When thus configured, the multifunction device 1 can set the start recording position KK to a position enabling recording the image in the middle of the check 4 or other form based on the actual length of the check 4 and the actual length of the image.

The multifunction device 1 according to this embodiment of the invention can also change whether the image is recorded front adjusted, is recorded back adjusted, or is recorded centered as specified by the user.

As a result, the multifunction device 1 can desirably set the start recording position KK according to the area where the image should be recorded on the check 4 or other form.

Embodiment 2

A second embodiment of the invention is described next.

Note that like parts in this and the first embodiment are identified by like reference numerals, and further description thereof is omitted.

In the multifunction device 1 according to the first embodiment of the invention described above the inkjet head 10 and paper length detector 38 are separated from each other based on the sizes of checks 4 that can be processed, and the check 4 can therefore pass the paper length detector 38, the length L10 in the conveyance direction of the check 4 can be detected, the start recording position KK can be set, and image recording can start from the start recording position KK while the check 4 is travelling at a constant speed in the conveyance direction.

In some implementations, however, the media detection sensor (a member corresponding to the paper length detector 38) and the recording head (a member corresponding to the inkjet head 10) may not be sufficiently separated relative to the length of the check 4, and the start recording position KK on the check 4 may have already past downstream in the conveyance direction from the position of the recording head by the time the check 4 passes the sensor.

In this situation, the multifunction device 1b (recording device) according to this embodiment of the invention operates as described below.

Figure 10A:
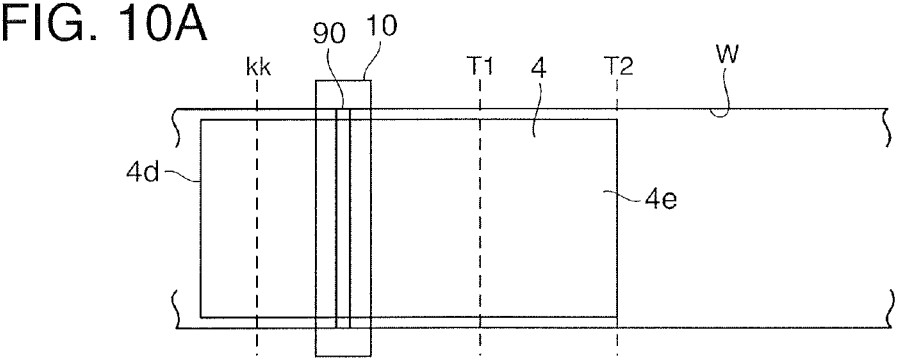
FIG. 10A, 10B and 10C are used to describe the operation of a multifunction device according to a second embodiment of the invention.
Figure 10B:
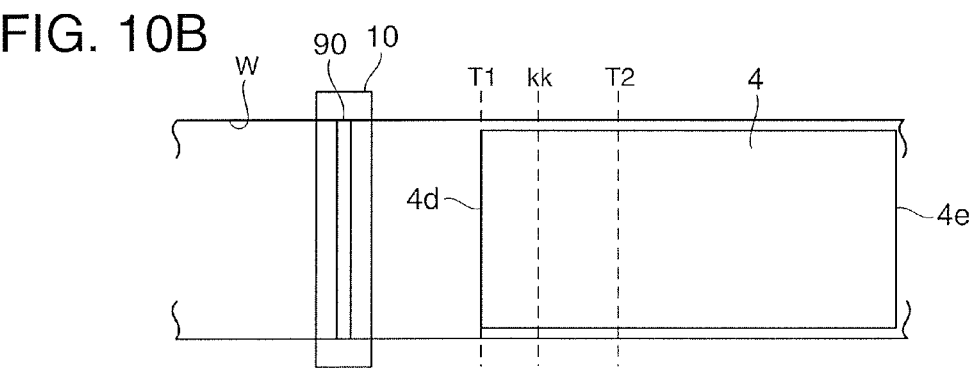

To describe the operation of the multifunction device 1b according to this embodiment of the invention, FIG. 10 shows the location of the inkjet head 10, the detection position T1 of the intermediate detector 46, and the detection position T2 of the paper length detector 38, on the conveyance path W.

The distance between the paper length detector 38 and the inkjet head 10 is shorter in the multifunction device 1b according to this embodiment of the invention than in the multifunction device 1 according to the first embodiment described above.

The multifunction device 1b according to this embodiment of the invention can also convey the check 4 a specific process amount in the opposite direction as the conveyance direction on the conveyance path W.

As described in the first embodiment, the trailing edge 4e of the check 4 must pass the paper length detector 38 in order to detect the length L10 of the check 4 being conveyed. When the trailing edge 4e of the check 4 is detected to have passed the detection position T2 of the paper length detector 38 (shown in FIG. 10A), the recording controller 70a determines if the start recording position KK, which is set based on the length L10 of the check 4 detected using the paper length detector 38, has passed downstream from the nozzle row 90 in the conveyance direction. If the start recording position KK has moved downstream from the nozzle row 90, image recording cannot start from the start recording position KK, and the recording controller 70a therefore stops check 4 conveyance. The recording controller 70a then controls the conveyance unit to reverse the check 4 until the leading edge 4d of the check 4 is at the detection position T1 of the intermediate detector 46 (shown in FIG. 10B). More specifically, the recording controller 70a back-feeds the check 4 until the start recording position KK is positioned upstream from the nozzle row 90 in the conveyance direction.

Figure 10C:
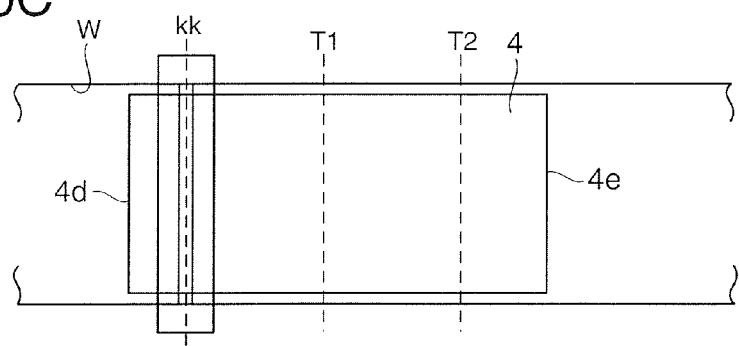

The multifunction device 1 then starts conveying the check 4 forward in the conveyance direction and starts image recording timed to the start recording position KK reaching the position corresponding to the nozzle row 90 (FIG. 10C).

With this operation, this embodiment of the invention can reverse feed the check 4 and start image recording from the start recording position KK even if at the time the trailing edge 4e of the check 4 has passed the paper length detector 38 and detecting the check 4 length is completed the start recording position KK on the check 4 has passed downstream from the inkjet head 10 so that recording cannot start from the start recording position KK.

Preferred embodiments of the invention are described above, but the invention is not limited thereto and can be varied and adapted in many ways without departing from the scope of the accompanying claims.

For example, the functions of the recording controller 70a, media length detector 70b, image length calculator 70c, and start recording position controller 70d are rendered in the multifunction device 1 in the foregoing embodiments. However, all or part of these functions can alternatively be rendered in the host computer 5 as a control unit. In this implementation, the host computer 5 can communicate with the multifunction device 1 to acquire the information required to implement the function of each function block. For example, for the host computer 5 to render the function of the media length detector 70b, the host computer 5 acquires the detection value from the paper length detector 38 by communicating with the multifunction device 1, and based on this acquired value detects the length of the check 4.

The method of detecting the length of the check 4 (media) with the media length detector 70b is also not limited to the specific method described above, and any other existing method can also be used.

The recording head in the foregoing embodiments is an inkjet head, but the invention is not so limited and the recording head could be a thermal head, dot impact head, or other type.

The function blocks shown in FIG. 3 can also be embodied as desired using hardware and software components, and do not suggest any specific hardware configuration.

The functions of function blocks of the multifunction device 1 can also be rendered in other devices externally connected to the multifunction device 1.

The invention can also be embodied as a program for executing the functions of the function blocks of the multifunction device 1. This program can also be provided stored on a suitable recording medium, including a hard disk drive, optical disc, magneto-optical disc, or flash memory.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A recording device, comprising:
a recording head disposed to a conveyance path of a recording medium;
a conveyance unit that conveys the medium in a conveyance direction through the conveyance path;
a recording control unit that writes image data for an image to be recorded on the medium to an image buffer, controls the recording head and the conveyance unit based on the buffered image data, starts recording the image from a specific start recording position on the medium, and records the image on the medium;
a media length detection unit that detects the length of the medium while the medium is conveyed by the conveyance unit;
an image length calculation unit that calculates the length of the image to be recorded based on the image data; and
a start recording position setting unit that, to record the image on the medium, sets the start recording position based on the length of the medium detected by the media length detection unit and the length of the image to be recorded on the medium calculated by the image length calculation unit,
wherein the start recording position setting unit sets the start recording position to the position for recording the image so that the trailing end of the image is positioned to a position corresponding to the trailing end of the medium by setting a position separated from the leading end of the medium by an amount corresponding to the difference between the length of the medium and the length of the image to be recorded on the medium as the start recording position.

2. The recording device described in claim 1, wherein:
the conveyance unit is configured to convey the medium in the opposite direction as the conveyance direction on the conveyance path;
a sensor that is used by the media length detection unit to detect the length of the medium is disposed to the conveyance path on the upstream side of the recording head in the conveyance direction; and
when the start recording position set by the start recording position setting unit has passed to the downstream side in the conveyance direction from the position of the recording head at the time the trailing end of the medium has passed the sensor and detecting the length of the medium by the media length detection unit is completed, the recording control unit conveys the medium in the opposite direction with the conveyance unit to position the start recording position on the upstream side in the conveyance direction from the position of the recording head, and then records the image.

3. A control device that controls a recording device having a recording head disposed to a conveyance path of a recording medium, and a conveyance unit that conveys the medium in a conveyance direction through the conveyance path, the control device comprising:
a recording control unit that writes image data for an image to be recorded on the medium to an image buffer, controls the recording head and the conveyance unit based on the buffered image data, starts recording the image from a specific start recording position on the medium, and records the image on the medium;
a media length detection unit that detects the length of the medium while the medium is conveyed by the conveyance unit;
an image length calculation unit that calculates the length of the image to be recorded based on the image data; and
a start recording position setting unit that, to record the image on the medium, sets the start recording position based on the length of the medium detected by the media length detection unit and the length of the image to be recorded on the medium calculated by the image length calculation unit,
wherein the start recording position setting unit sets the start recording position to the position for recording the image so that the image is positioned in the middle of the medium by calculating the margin between the leading end of the medium and the leading end of the image when the image is recorded in the middle of the medium based on the length of the medium and the length of the image to be recorded on the medium, and setting the start recording position based on the calculated margin.

4. A control method for a recording device, the recording device having:
a recording head disposed to a conveyance path of a recording medium,
a conveyance unit that conveys the medium in a conveyance direction through the conveyance path, and
a recording control unit that writes image data for an image to be recorded on the medium to an image buffer, controls the recording head and the conveyance unit based on the buffered image data, starts recording the image from a specific start recording position on the medium, and records the image on the medium,
wherein to record an image on the medium, the control method includes:
detecting the length of the medium while the medium is conveyed by the conveyance unit;
calculating the length of the image to be recorded based on the image data; and
setting the start recording position based on the detected length of the medium and the calculated length of the image to be recorded on the medium, wherein
said setting the start recording position comprises changing whether the start recording position is set to the position for recording the image so that the trailing end of the image is positioned to a position corresponding to the trailing end of the medium, or is set to the position for recording the image so that the image is positioned in the middle of the medium, according to a command, the start recording position is set to the position for recording the image so that the trailing end of the image is positioned to a position corresponding to the trailing end of the medium by
- setting a position separated from the leading end of the medium by an amount corresponding to the difference between the length of the medium and the length of the image to be recorded on the medium as the start recording position, and the start recording position is set to the position for recording the image so that the image is positioned in the middle of the medium by
- calculating the margin between the leading end of the medium and the leading end of the image when the image is recorded in the middle of the medium based on the length of the medium and the length of the image to be recorded on the medium, and
- setting the start recording position based on the calculated margin.

5. The control method described in claim 4, wherein:

the recording device
- is configured to convey the medium in the opposite direction as the conveyance direction on the conveyance path, and
- has a sensor used to detect the length of the medium disposed to the conveyance path on the upstream side of the recording head in the conveyance direction;

the control method further comprising:

when the start recording position set by said setting the start recording position has passed to the downstream side in the conveyance direction from the position of the recording head at the time the trailing end of the medium has passed the sensor and said detecting the length of the medium by the media length detection unit is completed,
- conveying the medium in the opposite direction with the conveyance unit to position the start recording position on the upstream side in the conveyance direction from the position of the recording head, and
- then recording the image.

6. A non-transitory computer-readable recording medium recording a program executed by a control unit that controls a recording device, the recording device having:
- a recording head disposed to a conveyance path of a recording medium, and
- a conveyance unit that conveys the medium in a conveyance direction through the conveyance path, and the control unit comprising
- a recording control unit that writes image data for an image to be recorded on the medium to an image buffer, controls the recording head and the conveyance unit based on the buffered image data, starts recording the image from a specific start recording position on the medium, and records the image on the medium, the program causing the control unit to function as:

a media length detection unit that detects the length of the medium while the medium is conveyed by the conveyance unit;

an image length calculation unit that calculates the length of the image to be recorded based on the image data; and a start recording position setting unit that, to record the image on the medium, sets the start recording position based on the length of the medium detected by the media length detection unit and the length of the image to be recorded on the medium calculated by the image length calculation unit, wherein the conveyance unit is configured to convey the medium in the opposite direction as the conveyance direction on the conveyance path;

a sensor that is used by the media length detection unit to detect the length of the medium is disposed to the conveyance path on the upstream side of the recording head in the conveyance direction; and the program further causes the control unit, when the start recording position set by the start recording position setting unit has passed to the downstream side in the conveyance direction from the position of the recording head at the time the trailing end of the medium has passed the sensor and detecting the length of the medium by the media length detection unit is completed, to control the recording control unit to convey the medium in the opposite direction with the conveyance unit to position the start recording position on the upstream side in the conveyance direction from the position of the recording head, and then record the image.

\* \* \* \* \*